United States Patent [19]
Mendes

[11] Patent Number: 5,779,392
[45] Date of Patent: Jul. 14, 1998

[54] SYSTEMS FOR CONTAINING AND COLLECTING OIL SPILLS

[76] Inventor: Joseph B. Mendes, P.O. Box 474, Agawam, Mass. 01001

[21] Appl. No.: 719,520

[22] Filed: Sep. 27, 1996

[51] Int. Cl.⁶ .................................................. E02B 15/04
[52] U.S. Cl. ...................... 405/63; 210/242.4; 405/60
[58] Field of Search .......................... 405/60, 63–72; 210/242.4, 924

[56] References Cited

U.S. PATENT DOCUMENTS

| | | | |
|---|---|---|---|
| 3,702,657 | 11/1972 | Cunningham et al. | 405/63 X |
| 4,187,187 | 2/1980 | Turbeville | 210/242.4 X |
| 4,555,338 | 11/1985 | Marchionda | 210/924 X |
| 5,133,881 | 7/1992 | Miller et al. | 210/924 X |
| 5,348,661 | 9/1994 | Hill | 210/242.4 X |
| 5,380,431 | 1/1995 | Newsom | 210/924 X |
| 5,569,331 | 10/1996 | Barber | 210/924 X |

FOREIGN PATENT DOCUMENTS

| | | | |
|---|---|---|---|
| 0691414 | 10/1979 | U.S.S.R. | 210/924 |
| 0716567 | 2/1980 | U.S.S.R. | 210/242.4 |

*Primary Examiner*—Dennis L. Taylor
*Attorney, Agent, or Firm*—Ross,Ross & Flavin

[57] ABSTRACT

A method for capturing ecologically harmful substances in the nature of hydrocarbons from the surface of a body of water or from the ground adjacent a landfill or waste dump or from a shoreline of a body of water into which residual waste fluids from an adjacent ground leakage is passed.

1 Claim, 7 Drawing Sheets

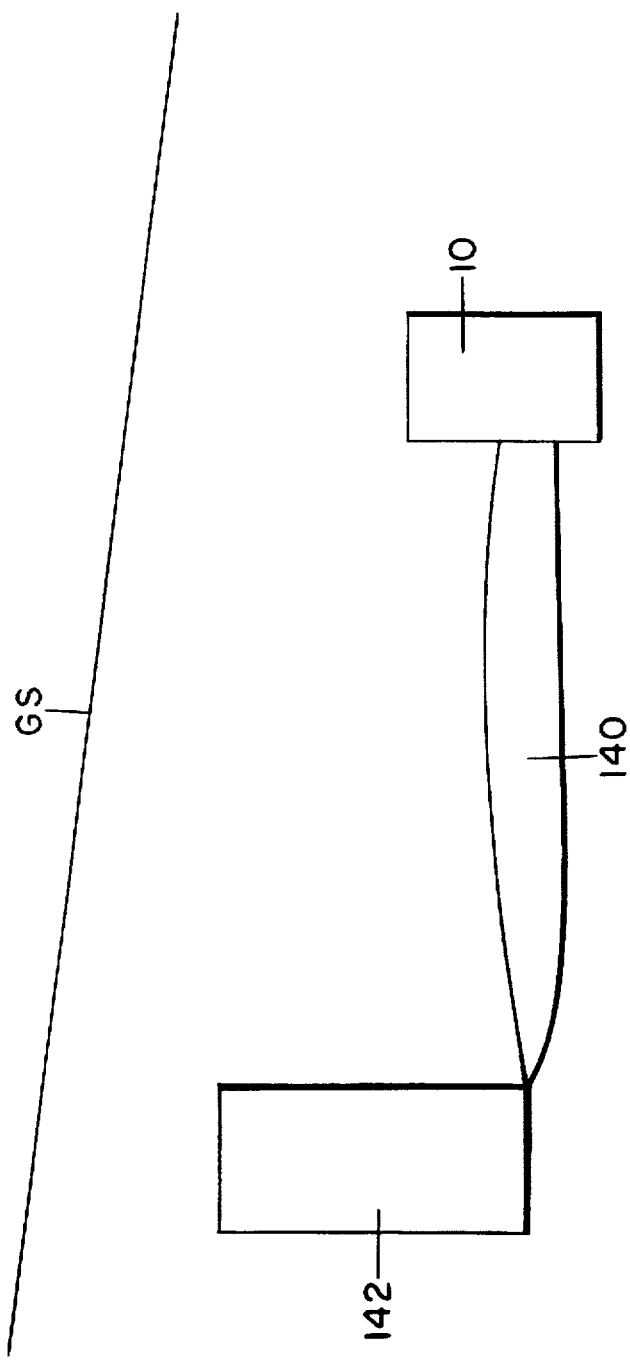

SYSTEMS FOR CONTAINING AND COLLECTING OIL SPILLS

BACKGROUND OF THE INVENTION

1. Field of the Invention

This invention relates to pollution control systems for collecting and containing hydrocarbons spilled in a body of water or leaking from a landfill or waste dump or underground storage tank, and are particularly applicable for minimizing the catastrophic effects of a spreading of a spillage or leakage.

The fluid capture system provides an efficient and cost effective containment system for the controlled removal of hydrocarbons within a contaminated area, as will be shown infra.

The system is particularly useful for the collection of residual waste fluids generated by a leaking storage facility or a landfill or waste dump and for reducing the spread of a plume of subsurface contaminants for the purpose of preventing the pollution of storm water drainage, sewer systems, or ground water supplies with ecologically harmful substances.

The invention has use for the restraint of lateral migration of a variety of hazardous fluid materials, principally hydrocarbons, while allowing for the controlled removal of the undesirable fluids from the contaminated area.

2. Description of the Prior Art

Increasing concern over the need to economically and practically remove oil from water has prompted disclosure of many inventions, as evidenced by the following representative patents which have been preliminarily evaluated in the course of investigating the prior art:

Cunningham et al. U.S. Pat. No. 3,702,657, is a containment boom and consists of a rectangular enclosure divided into two or more compartments divisible into front and rear compartments, each compartment being designed to hold a "bag" or "pillow" of a sorbent material.

A complex series of floats and anchors is used to position the stationary device in a desired position, whereas the invention hereof is not a boom and is designed, in one aspect, to be actively advanced into an oil slick as it is towed by water craft. No anchors or floats are needed in its mobile configuration. It may be used alternatively in a fixed array.

The Cunningham device contains other design limitations which would prevent its effective use as a towed array. The front and rear compartment configuration would prevent the sorbent in the rear compartments from effectively interfacing with the hydrocarbons as the front compartment's bag or pad of sorbent material becomes saturated with oil, both oil and water being prevented from flowing freely through the device.

The design is such that the front facing pads or bags of sorbent will absorb the petroleum hydrocarbons to become fully sorbed and prevent water and oil flow through to the rear pads.

In a towed array, the added weight and loss of buoyancy of the fully sorbed forward facing pads or bags, would serve to unbalance the device by making the rear much more buoyant, thereby allowing wave action to tumble the cage forwardly along its longitudinal axis, rendering the device unsuitable.

Lafay, U.S. Pat. No. 4,919,820, describes a series of mesh bags filled with waterfowl feathers, linked together to form a containment boom. A waterborne oil slick would be surrounded by this containment boom with the feathers absorbing the oil slick at the oil slick perimeter. It further teaches that the bags may be compressed and oil mechanically extracted from the feathers.

The system hereof is not a containment boom. It is designed and conceived in modular form to actively confront a waterborne oil slick. Towing vessels will tow a longitudinally linked "train" of oil trap modules through a slick, with cleaned water exiting the traps on the downstream side.

One of the weaknesses of Lafay is that the mesh bags holding the feathers are not rigid. Therefore, the container will conform to the shape of the mass of feathers if current is present. This would negate the ability of the sorbent to be tumbled in rough seas or high wind conditions. The inherent design of the flexible mesh bags, coupled with their limited capacity limits its scope of deployment applications.

Since this device functions as a boom and acts as a passive device which only absorbs the perimeter of a floating slick, it is subject to the same limits of effectiveness as traditional booms. Wave action and high wind can push the oil under the bags and rough seas can slop oil over the device, compromising its containment capabilities.

Bogosian, U.S. Pat. No. 3,739,913 of Jun. 19, 1973, teaches a containment boom for "temporarily fencing oil spills on water for retention and absorption of the oil" and does not address the need to actively confront a waterborne oil slick, and to remove the oil from the water, except in a passive absorption mode.

The Bogosian device utilizes an elongated series of sleevelike mesh containers to hold oil absorbing materials to fence an oil spill.

In a towed arrangement, the Bogosian device would not lend itself to an array of sufficient length because of the forces generated by the weight and water resistance offered by the loaded bags or sleeves. Thus the concept of flexible mesh sleeves which are knotted together with rope is inappropriate. Rope of sufficient strength would be of such great diameter that the bags would sink under the weight of the rope and knot arrangement.

The mesh bags described must be removed from the water in order for the sorbent to be replaced and the knots need to be untied and retied.

Hill, U.S. Pat. No. 5,348,661, describes a boom constructed to hold a bladder filled with an absorbent material for the containment of oil spills. It utilizes the concept of a containment boom with a sub-surface "curtain" to prevent oil from being pushed under the boom and it utilizes a series of snaps or zippers to remove the bladder from the device and replace it with fresh material.

Smith, U.S. Pat. No. 3,539,013, is a compressible boom consisting of flattened elongated bats of oil absorbing material with a tension cable laid along the inner edge of the bat. It utilizes a mesh sleeve of tubular configuration which contains a sorbent material. It utilizes a mesh net "woven or knotted like a fisherman's net". Longitudinal bats are heat sealed or sewn together to form a boom.

A cursury review of the above-cited patents shows that the prior art is indeed clearly distinguishable from and does not make "obvious" the present invention.

SUMMARY OF THE INVENTION

Reference to "oil spills" herein is intended to cover any undesired discharge of a petroleum product on any body of open water or any spillage or leakage from a landfill or waste dump or storage tank. Reference to "sorbent material" refers to a material with the capacity to absorb or adsorb oil.

Typical of the liquids envisioned herein are the great plurality of liquid hydrocarbons, including but not limited to, gasoline, kerosenes, light and heavy oils, jet fuel, petroleum, asphalt and paraffin crudes, diesel oil, naphtha, water-immiscible ketones, aromatic solvents such as benzene, toluene and xylene, terpenes, esters, phenols, aldehydes, amides, amines, mercaptans, fatty acids, fatty acid esters, halohydrocarbons, polar organic compounds, and the like. Any of these compounds are referred to hereinafter as "hydrocarbons" or "oils".

Oil spills on water are usually the result of accidents occurring during the production and distribution of oil and its derivatives. Most such accidents involve ship loading and unloading, groundings, collisions, offshore drilling blowouts, and pipe fractures.

Spillages in or on water, resultant from oil drilling operations at sea or whilst oil is being transported over the sea, shipwrecks and harbor pollution, are sources of the spew of oil into the water wherefore hydrocarbons, immiscible with and lighter than water, comingle with the water body.

Invariably, in the case of oil spills, whether at sea or on a river or lake, the oil is driven toward or along the coastline, by wind and/or wave action or other currants so that it is obviously essential that same be contained, hopefully before washing up at the shoreline.

Spillages from inground installations, such as storage tanks, waste dumps or landfills, are invariably the result of carelessness on the part of personnel making thoughtless or wasteful facility usage.

In the case of leakage from a landfill, a waste dump or a storage tank, there is the need for hazardous waste containment and especially to a method for preventing, for example, the migration and leaching of hazardous fluid substances into the water table.

There has long been a desire for an oil-recovery system that would (1) permit a faster response to a problem, (2) work better in bad conditions, such as rough water or nearness to obstacles, (3) contain the extent of the oil spill more quickly, (4) permit easier deployment, and (5) allow for easier collection.

The structural aspect hereof teaches a boxlike trap arrangement of top and bottom and side and end open mesh type panels, and a mass of fibrous oil-absorbing material consisting of a synthetic polymer in the form of a hydrophobic oleophilic fibrous material charged into the box interior.

The trap can be floated upon the water body or entrenched along an adjacent shoreline or augured in the soil, in any case surrounding the area to be contained, restricted or protected.

The method aspect hereof teaches the providing of an oil collection trap or a floatable series of interconnected traps oriented to capture the floating oil slick and to channel same towards the traps by the progressive approach of the traps to the oil slick or of the oil slick to the traps so as to entrain the threshold of the oil and water flowing immediately into the traps and then to capture the oil while releasing and exiting therefrom the oil-free water.

Additionally, the invention envisions a capturing of any hydrocarbon contaminants in a contaminated plume leading from a leaking underground storage tank or dump or landfill with the trap or traps being positioned substantially perpendicular to the plume incident thereto. That is an in-ground containment wall comprising a plurality of engaged, interlocked, vertical pass-through traps installed in the ground and through which the controlled removal of the contained hydrocarbons and other materials from the contained or restricted area is attained and treated.

The preferred method for implementing the invention includes the trenching and auguring in the soil surrounding the area to be contained, restricted or protected, preferably to an underlying, impermeable strata, for the installation of the interconnected traps so as to produce the in-ground containment or restriction wall.

The exemplary embodiments hereof comprise the utilization of one or more traps of the pass-through type which allows the flow of fluids into the traps from which the hydrocarbons can be removed whilst allowing the flow through of the other fluids.

A contained area as used herein is defined by the building of a completely surrounding barrier wall, surrounding the area 360°, or by the building of an appropriate restriction wall of less than 360° coverage which effectively contains the restricted area, taking into account the direction or directions of flow and the contaminated fluids.

BRIEF DESCRIPTION OF THE DRAWINGS

FIG. 9 is a block diagram showing the leakage from an underground storage tank, a containment plume, and a strategically located barrier.

DESCRIPTION OF THE PREFERRED EMBODIMENTS

Figures 1, 1A:
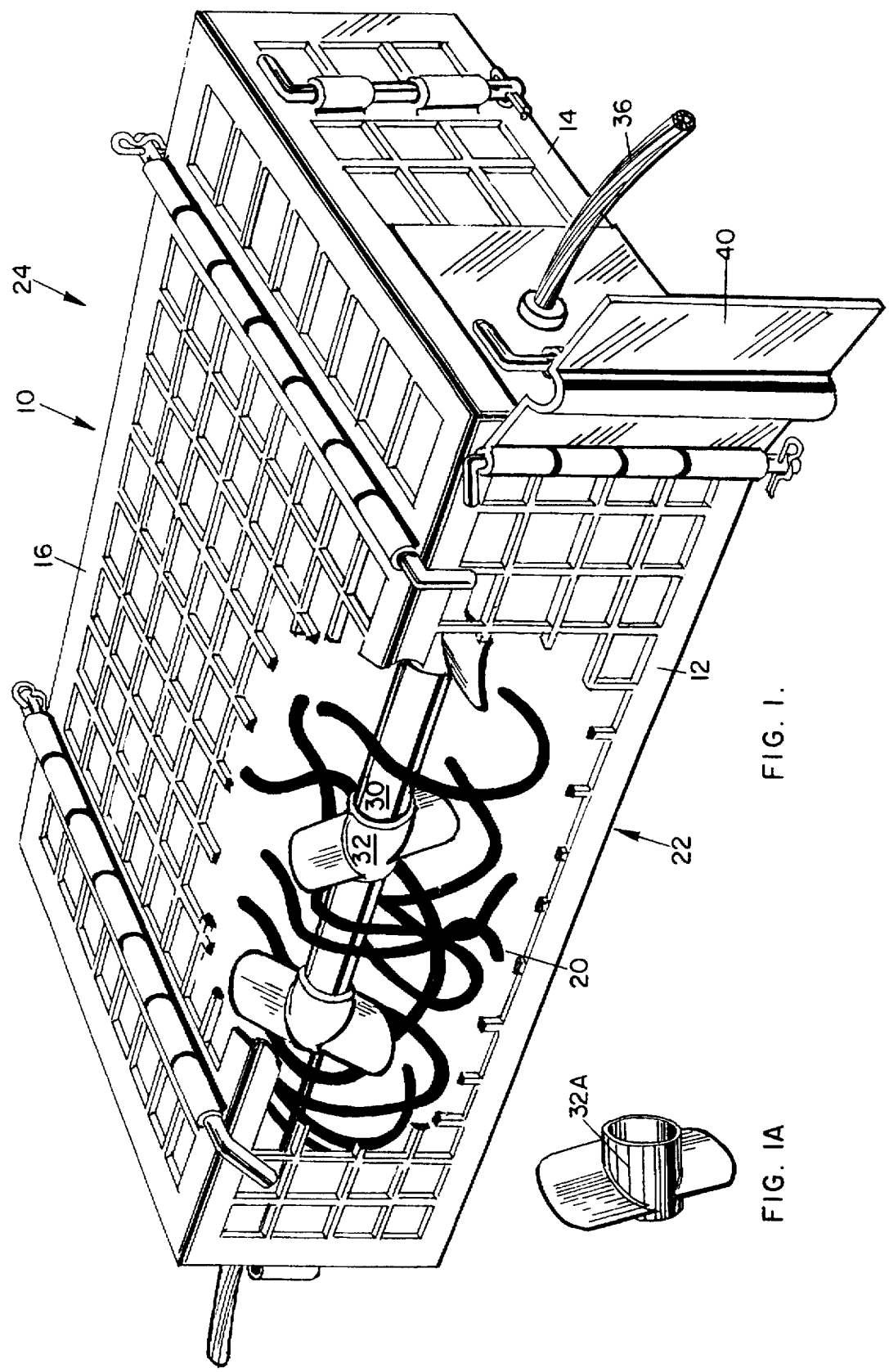
FIG. 1 is an isometric view of the trap or barrier of the invention.
FIG. 1A is an isometric view of one of the paddles.

The invention comprehends a flow-through pollution trap or barricade or oil trap module for the control and removal of oil spill hazards in a water environment or in a land area sustaining leakage from a landfill or waste dump or underground storage tank.

Conceptually it includes an individual trap or module or a series of connected-together traps or modules, the trap or series being of a length or width adequate for satisfactorily confronting the dimensions of an area in which a particular spillage has occurred.

A rectangular or box-shaped sieve-like trap or module 10 is formed by framed front and rear side panels 12, framed end panels 14, a framed top panel 16, and a framed bottom panel 18, each being formed of an outer peripheral framework supporting an interior formed of criss-crossed slats cooperatively defining an area of maximum openness for permitting the free and easy entry of fluid into, through and outwardly of the trap. while yet offering an adequacy for supporting within the trap a charge 20 of an oil sorbent material.

The trap may be constructed of metal, wood, or any other nonmetallic materials such as any engineered plastic compound.

For purposes of orientation, the front or forward side or bow of the trap is delineated as 22 in FIG. 1, with the rear or rearward or stern side being delineated as 24. In operational use, the trap will normally be positioned so that the bow confronts the spillage to be entrapped.

The trap dimensions may vary, being limited more by the nature of the spillage problem encountered, the area of exposure, and the quantity of sorbent material necessary in accordance with a particular usage.

Figure 2:
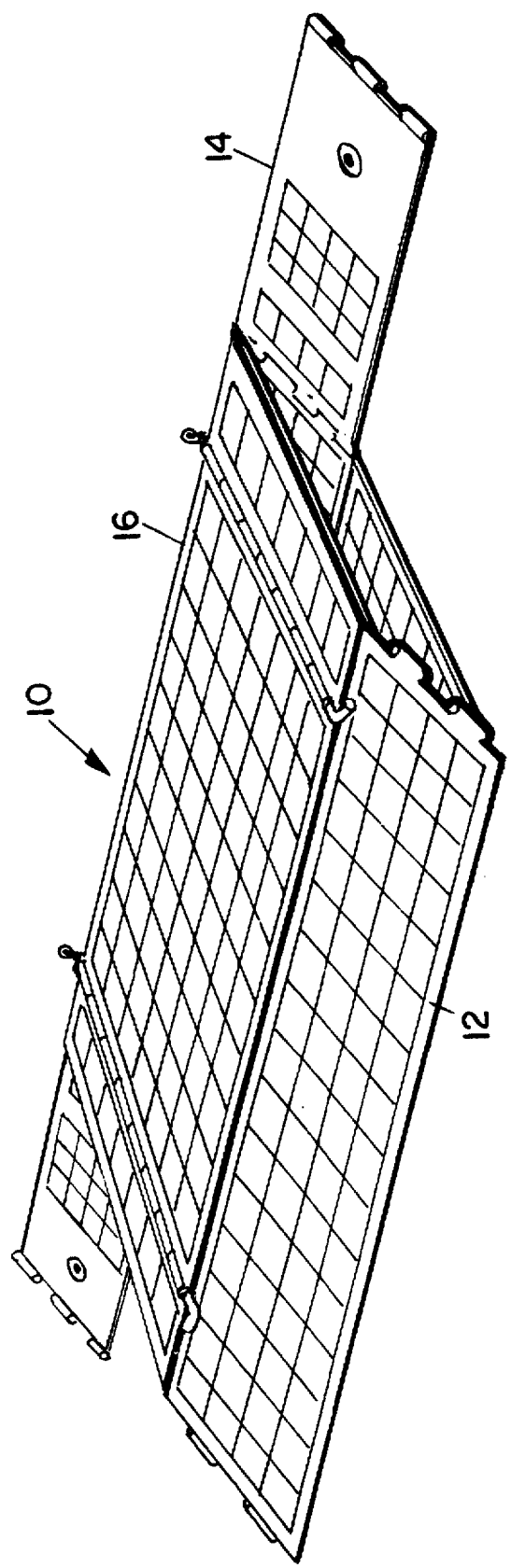
FIG. 2 is a small scale isometric view showing the trap in collapsed position.

To facilitate storage, transportation and deployment the traps are designed to fold along their horizontal plane in trapezoid configuration as shown in FIG. 2. When opened and pinned through the hinge sleeves 42, the trap becomes rigid along all of its planes.

An elongated, horizontally-disposed tube 30 is mounted interiorly of the trap and extends from one end panel 14 to opposite end panel.

The outer tube wall mounts a plurality of spaced, helically-arranged paddles 32, same being secured as by bolting or weldments. The paddles are shown in FIG. 1 as angled but they may be designed in any of several configurations: flat, cupped, or angled at various pitches to maximize efficiency in differing current or towing velocities. As shown in FIG. 1A, the paddle 32A may have fins which are in right angular relation to the longitudinal axis of the tube upon which they may be mounted.

The paddles define an agitation system which is freewheeling in design, it being activated by the forward motion of the modules when towed, or current or wave action.

The paddle agitation array allows the sorbent material to be exposed to a churning action leading to a more rapid absorption of the offending oil, the material being continually engaged in the wicking action at the interface with the oil slick. No significant portion of the sorbent material becomes fully sorbed to the exclusion of any other area of the material confined within the module.

A towing cable 36 is freely extendable through tube 30 and passes outwardly therefrom through provided openings in each end panel.

Figure 6:
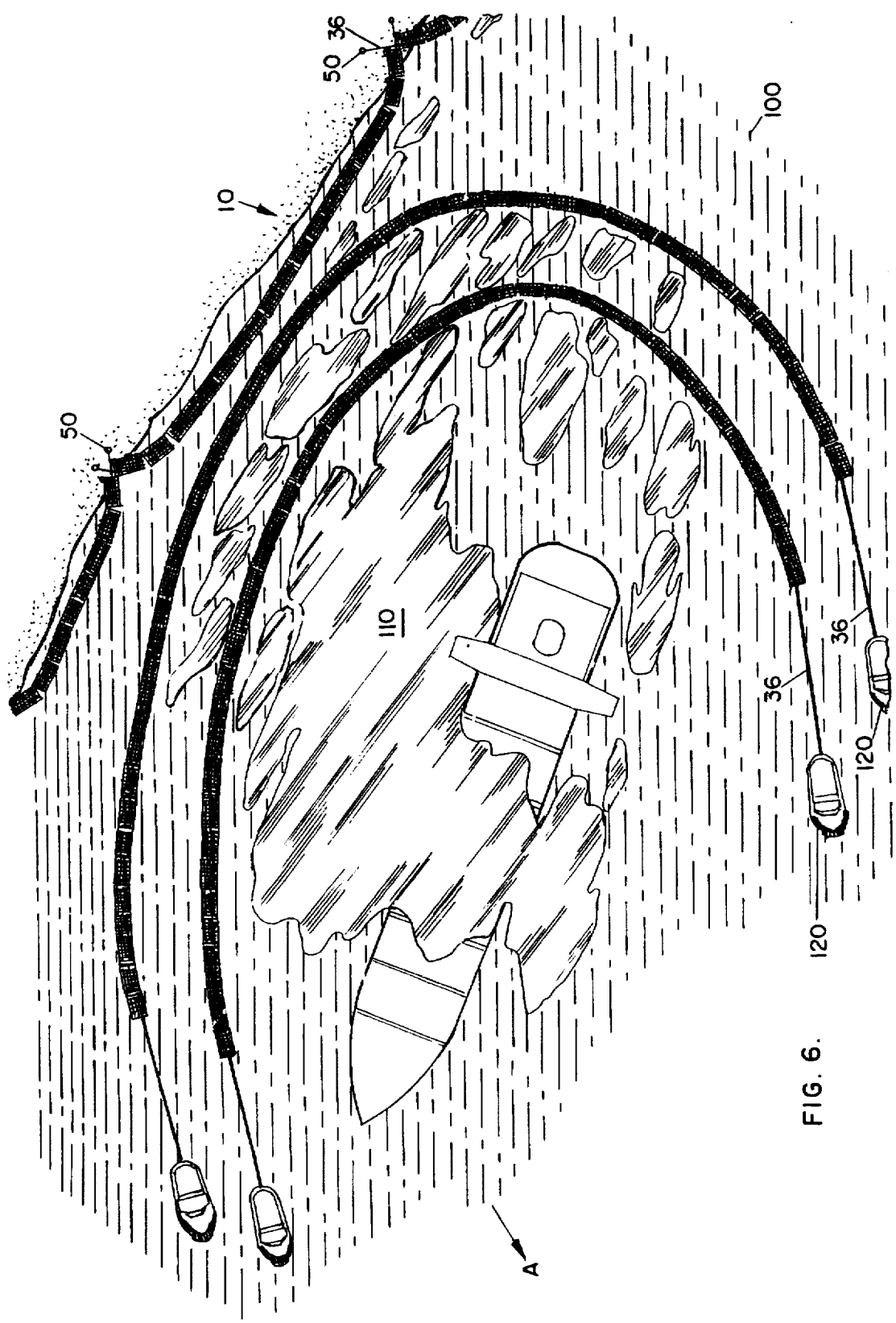
FIG. 6 is a small scale isometric view of a pair of series of traps in the towing position relative to an oil spill and of a trio of series of traps anchored at a shoreline.

The cable may be of a single length or plural lengths joined together and passable through the traps in the case of a series of traps positioned in end-to-end relationship, the cable serving to connect and to hold together the traps of the series and to allow the towing of the trap series by the cable ends or to permit anchoring of the series by the staking of the cable at each of its ends by pins 50 as shown in FIG. 6.

Thus the trap modules can be "hingedly" connected to each other in a trainlike arrangement with the cable running longitudinally through the interconnected units with each opposite end attached to a tow craft for towing the U shaped arrangement into the waterborne oil slick.

The cable 36 between adjacent traps provides an allowable pivotal relationship between adjacent traps, one trap being allowed a freedom of rotative motion relative to its next adjacent trap. That is, the joints between traps define a pseudo universal joint arrangement so as to allow a sufficient degree of flexibility in responding to wave or current imposed orientations without excessive flexural stressing.

The traps or modules are expressly designed and configured to withstand the stresses associated with towing an interconnected series, the stresses exerted along its longitudinal axis being equalized by the tubes in the respective traps.

Each pair of adjacent traps is provided with a flexible liquid impervious membrane 40 extending between the confronting side panels, the membrane facing the spillage being confronted, and being intended to close off the space between the adjacent traps for denying passage of any liquid therethrough.

A charge of oil sorbent material 30 is loosely arranged and filled in the trap interior through an end opening, each end panel 64 being hingedly connected at 15 and latched at 17 to the trap structure. Equivalent arrangements may be substituted therefor in order to allow the charging of the sorbent material into as well as the withdrawal of same from the trap.

The charge is of an oil sorbent material, capable of allowing water to pass freely therethrough whilst remaining oil wet (oleophilic) when contacted by an oil water mixture, is removably held in each trap.

Not all materials are useful for the purpose hereof, that of providing an effective flow through barrier, but it has been observed that a large variety of fiber-forming materials will function within the scope of the inventive concept.

Sorbent materials suitable for use are those having a cellular structure sufficiently open to allow water to pass freely and yet remain oil wet or oleophilic when contacted by an oil-water mixture so as to adsorb or absorb the oil products encountered.

The polymeric materials contemplated for usage have been identified earlier in this specification.

The polymeric fibers may be combined into a bonded mat-like structure by any known process, for example, such as disclosed in U.S. Pat. No. 2,746,895, so as to define a mass of entangled filaments having large numbers of interconnected interstitial voids and into which oil is received and retained substantially to the exclusion of water.

The material, when immersed in an oil-water mixture, allows the oil to displace water from a surface thereof. That is, it is wetted by oil to the extent that water is rejected from the internal voids, while oil is retained.

Suitable binders, preferably not deleteriously affected by water or hydrocarbons, including thermoset binders (phenols or melamines) may be employed.

Dependent on the length and amount of polymeric fibers employed, sufficient entanglement may be achieved to eliminate the need for a binder or, at most, necessitate usage of only a small amount of binder to prevent a sift out of the shorter fibers. The polymeric fibers may even be loosely blended into an unbonded structure so as to be retained by the trap itself.

The barrier containment pass-through walls allow the controlled removal of the contaminants by passage into and capture within the barrier-like configuration, which barrier can be floated upon the water body or entrenched along an adjacent shoreline or augured in the soil, in any case surrounding the area to be contained, restricted or protected.

Any slight negative buoyancy of the trap structure is offset by the buoyant nature of the oleophylic material contained therewithin.

Normally, the hydrocarbons will float as a film or single interfacial layer or slick upon the water or in a multi-interfacial system having plural discrete interfaces, as in the case of an emulsion.

Efforts to separate the hydrocarbons from the water may be complicated by a reduced thickness of the oil film which is formed around wave action.

Figure 5:
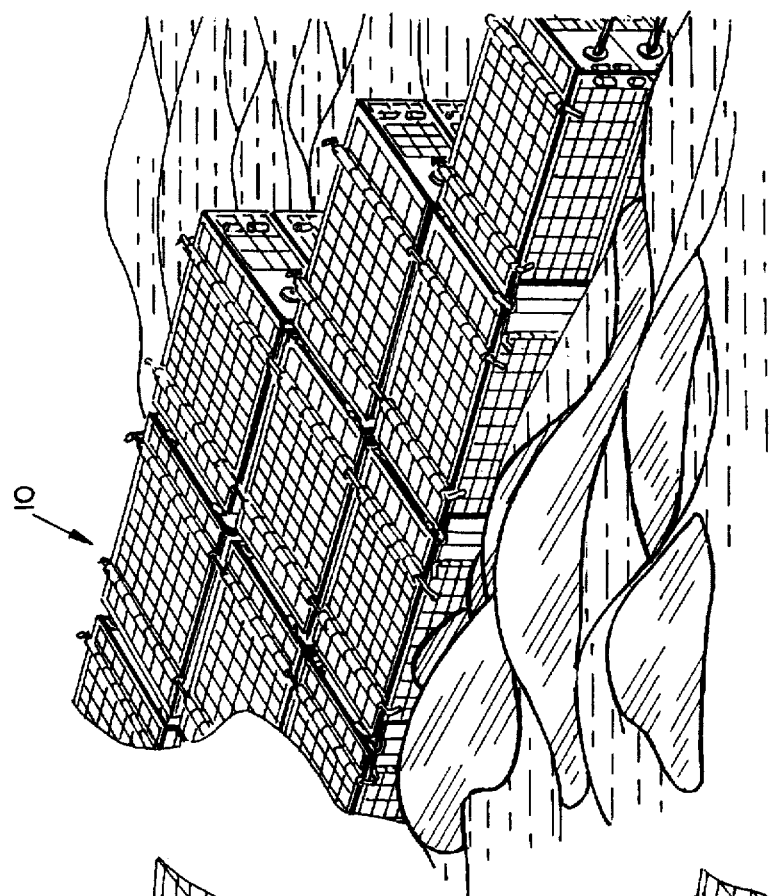
FIG. 5 is a fragmentary isometric view of tiers of traps interconnected in series.
Figure 3:
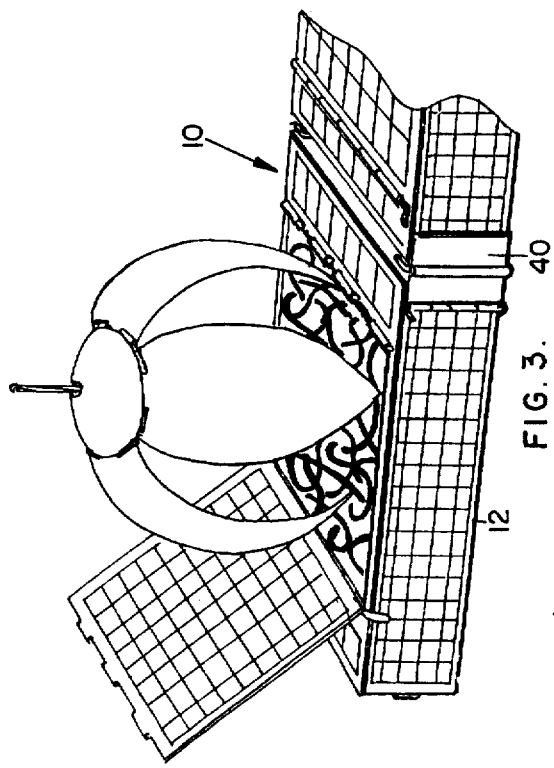
FIGS. 3 and 4 are fragmentary small side views of a trap with a grapple in association therewith for charging or emptying the trap of its contents.
Figure 4:
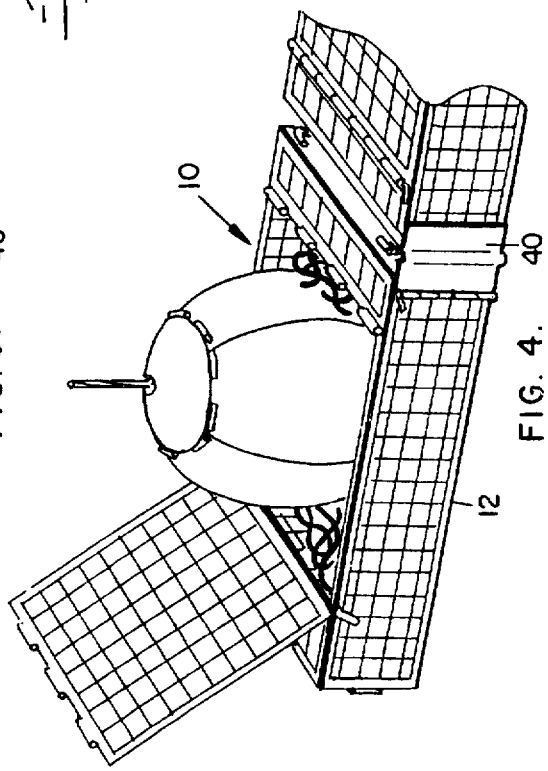

While the traps are usually arranged in a single serial array, as is presently preferred, they can be arranged in a horizontally stacked relationship, as shown in FIG. 5.

In FIG. 6, I have shown a pair of series-connected traps, each consisting of a plurality of interconnected traps and each arranged in a semi-circular confrontation in a body of water 100 surrounding an oil spill 110.

The traps are maintained in position by the cables 36 which connect the interconnected traps of the series to tug boats 120 at opposite ends of the series, with the boats moving in the direction indicated by arrows A.

Figure 7:
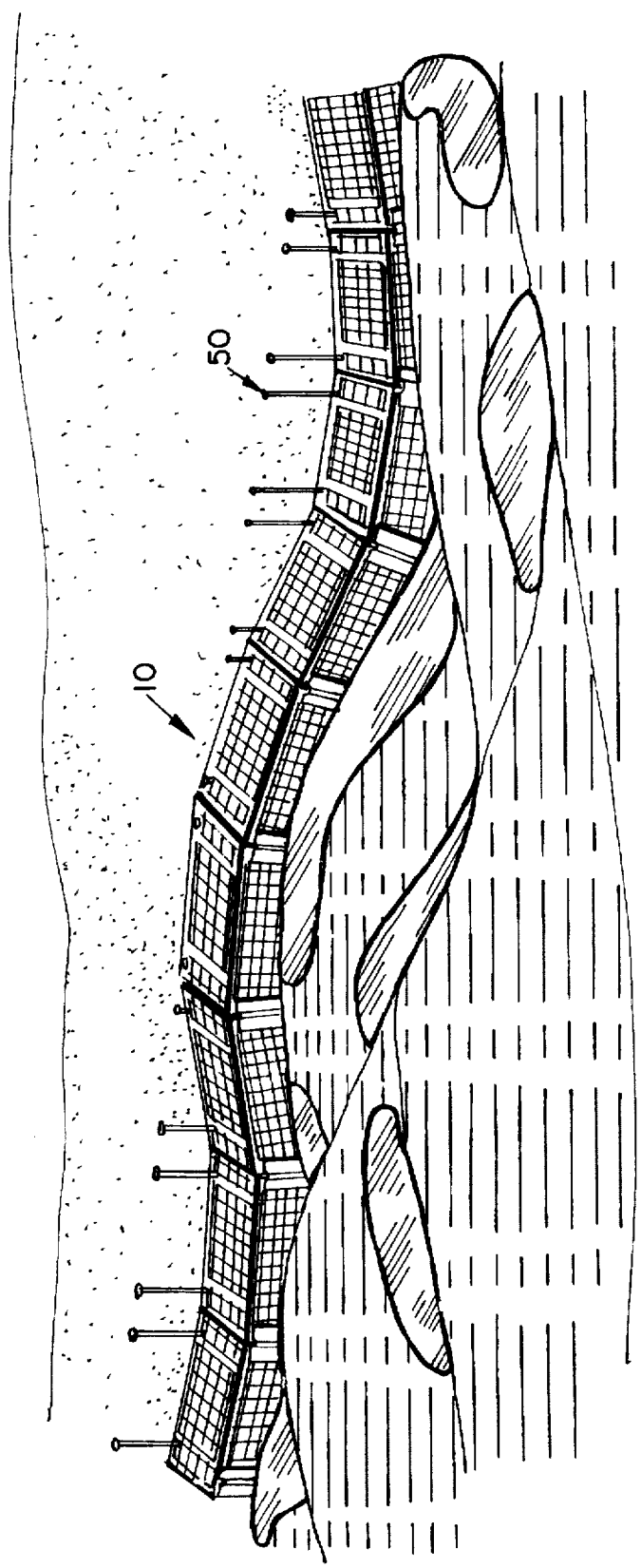
FIG. 7 is a fragmentary isometric view of a series of interconnected traps anchored along a shoreline.

In FIG. 7, an arrangement of a series of traps 10 are tied at their opposite ends by virtue of anchoring the cable 50 relative to the configuration of a shoreline so as to preclude the oil spill arriving from the open sea from reaching part of the shoreline, be it a beach, harbor, port or the like, and for confining the hydrocarbons which may have escaped from an oil tanker which may have sustained an accident to a limited area.

It is to be understood that the interconnected system of traps can be installed in any water environment operational area to provide a cleaning factor against any oil spill hazard present.

Conceivably, the barrier could be established in situ prior to any potential need.

The dragging of the trap through the water assists in the creation of a churning or oscillating motion within the trap, the agitation increasing the action of the media so as to enhance its absorbency effectiveness.

The oil sorbent material is capable of allowing water to pass freely therethrough while remaining oil wet when contacted by an oil-water mixture.

Figure 8:
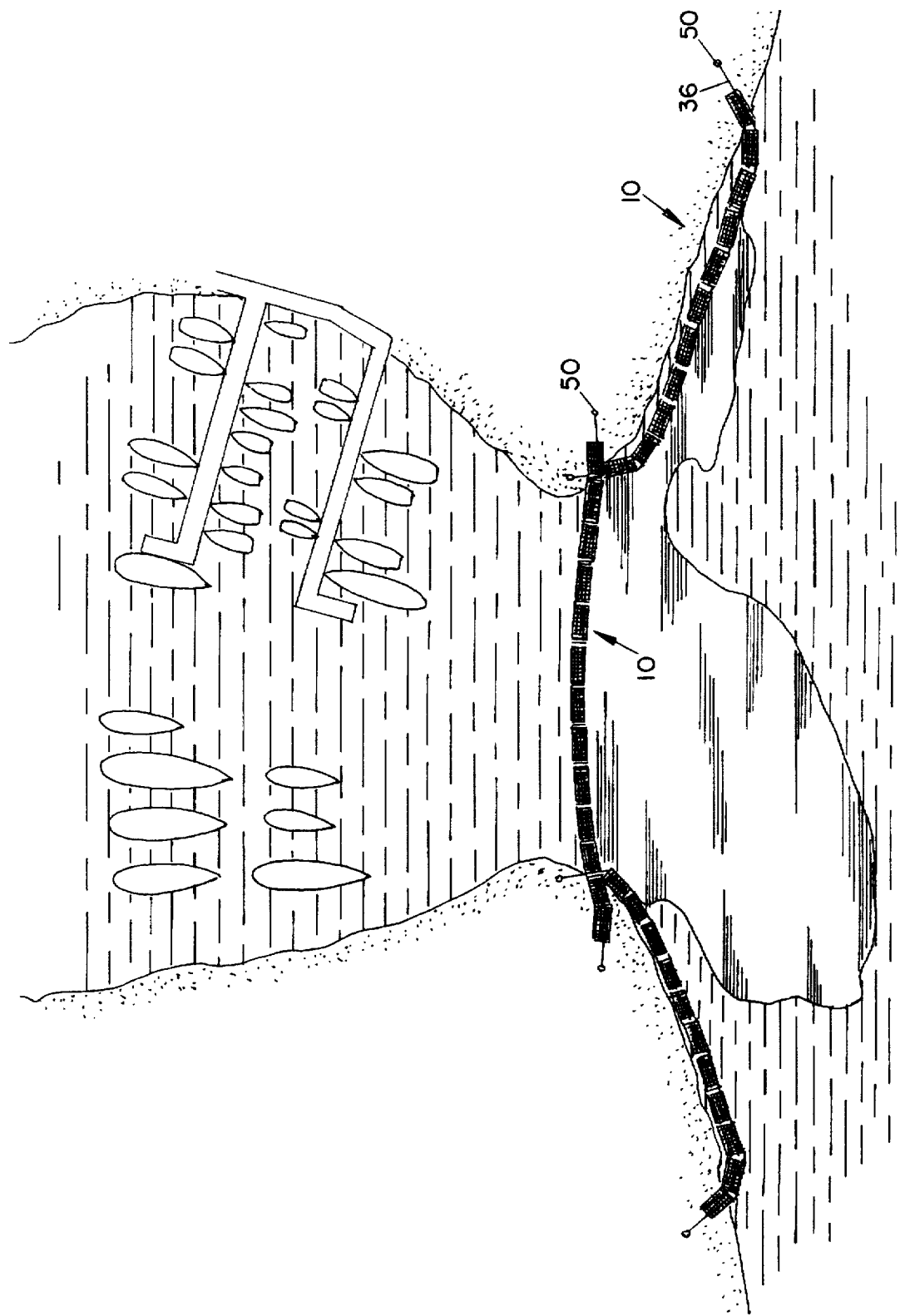
FIG. 8 is a small scale schematic view showing a series of traps in blocking position relative to an inlet.

In FIG. 8, I have shown a series of traps in a blocking position relative to an inlet 130.

In this, as in all exemplifications herein, it is observed that the traps can be towed to and through an oil slick or positioned stationarily along a shoreline or across an inlet or the like, for trapping the petroleum hydrocarbons while cleaned water passes through and exits the device.

In FIG. 9, I have shown by block diagram the containment plume or aquifer or leakage 140 from a storage tank 142 below the ground surface GS with a trap 10 strategically located so as to capture the leaking contaminants. The trap or barrier serves to reduce the spread of a plume of subsurface contaminants.

The hazardous waste contaminant system hereof is also useful in precluding the lateral migration and leaching of the hazardous fluid substances into a water table, particularly for sites located over a fluid impermeable strata of clay or the like, while allowing the flow of same toward and into an adjacent water body such as the ocean, river or lake at the shoreline thereof, and allowing the controlled removal and/or in situ treatment of the fluid substances including the hydrocarbons.

Preparation is made by trenching, auguring or digging a vertical opening or excavation of prescribed depth, width, and/or diameter in the soil or shoreline surrounding the area to be contained, restricted, or protected, down preferably to an underlying, impermeable strata, and deploying a series of interconnected barrier members to produce the in-ground containment or restriction wall adjacent the leakage zone.

The system makes use of the aquifer emptying into an adjoining body of water such as a shoreline of an ocean, river, lake or pond, the aquifer being a fluid bearing stratum of permeable rock or sand or gravel along which the hydrocarbons may migrate and leach.

The contaminated waste fluid is passed laterally through the permeable body in a time period, as determined by the permeability of the body, the differential pressures, etc.

I claim:

1. Oil skimming apparatus for minimizing the effects of a spreading of a spillage or leakage of liquid hydrocarbons on a body of water comprising:

a plurality of traps suited for end-to-end disposition upon a body of water, each trap being box-like in configuration and having top and bottom and side and end open mesh type panels, a charge of strands of a polyolefin in each trap with interstices throughout the charge for increasing the adsorbing oil ensnaring characteristics of the charge, an elongated horizontally-disposed tube freely mounted interiorly of each trap and extendable between the opposite end panels of each respective trap, a plurality of spaced helically-arranged fins mounted on each tube exterior for defining in concert with a respective tube an agitation mechanism, a continuous towing cable freely extendable through each tube for connecting and holding together the traps of the series and for allowing the towing of the trap series by the cable ends or to permit anchoring of the series by the staking of the cable at both of its termini, the cable serving to support each tube in a free-wheeling rotative manner responsive to the motion of the water flowing through each trap with such rotation effecting agitation of the strands of the charge, and a flexible liquid impervious membrane between the spillage confronting side panels for closing off the spaces between adjacent traps.

* * * * *